United States Patent [19]

Landoll

[11] 4,267,310

[45] May 12, 1981

[54] PROCESS FOR PRODUCING SPHERICAL PARTICLES OF CRYSTALLINE POLYMERS

[75] Inventor: Leo M. Landoll, Wilmington, Del.

[73] Assignee: Hercules Incorporated, Wilmington, Del.

[21] Appl. No.: 107,472

[22] Filed: Dec. 26, 1979

[51] Int. Cl.$^3$ ............................. C08J 3/12; C08J 3/20; C08J 3/08

[52] U.S. Cl. ........................... 260/40 R; 260/33.6 R; 260/34.2; 260/37 N; 525/69; 525/90; 525/92; 525/94

[58] Field of Search ............. 260/34.2, 33.6 R; 528/497, 498; 252/621 P

[56] References Cited

U.S. PATENT DOCUMENTS

| | | | |
|---|---|---|---|
| 3,586,654 | 6/1971 | Lerman et al. | 260/34.2 |
| 3,669,922 | 6/1972 | Bartsch et al. | 260/34.2 |
| 3,674,736 | 7/1972 | Lerman et al. | 260/34.2 |
| 3,910,846 | 10/1975 | Azar et al. | 260/29.2 R |
| 3,925,295 | 12/1975 | Osborn et al. | 260/34.2 |
| 4,060,511 | 11/1977 | Sinclair et al. | 260/34.2 |
| 4,110,529 | 8/1978 | Stoy | 260/34.2 |

*Primary Examiner*—Allan Lieberman
*Attorney, Agent, or Firm*—Hazel L. Deming

[57] ABSTRACT

A process for producing uniformly spherical particles of crystalline, normally solid condensation polymers is described. The process of this invention further provides high yields of hydrophobic, non-agglomerating particles in a useful size range directly, without the need for subsequent processing, and is carried out by forming a dispersion of small liquid particles of the crystalline polymer in certain aprotic liquids containing 0.1 to 20% by weight of the polymer of a water-insoluble block or graft copolymer having at least one polymeric component which is soluble in the aprotic liquid and at least one other polymeric component which is insoluble in the aprotic liquid and associates with the crystalline polymer, in a specified manner, cooling the dispersion with agitation until the liquid particles solidify and recovering the particles.

15 Claims, No Drawings

PROCESS FOR PRODUCING SPHERICAL PARTICLES OF CRYSTALLINE POLYMERS

This invention relates to the art of preparing small, spherical particles of polymeric materials and more particularly to a process for producing particles of crystalline condensation-type polymers in the form of small, hydrophobic, non-agglomerating spheres.

Crystalline polymers, and particularly condensation-type polymers such as the polyesters and polyamides, possess a unique combination of properties which makes them ideal candidates for coating applications. For many of these applications it is also advantageous to have the polymer in the form of relatively small, uniform spherical particles. This is particularly the case when the intended use is as a fusion coating to be applied in the solid state, as, e.g., by fluid bed techniques.

The preparation of small particles of solid, crystalline condensation polymers has always been something of a challenge to the polymer chemist. The ideal technique would be to develop a method of direct polymerization to the desired particle size. This has not been possible, however, except in a few isolated instances. Therefore, the processes generally employed have involved either comminution, spray drying or dispersion techniques.

Comminution, as by grinding, is difficult and expensive and results in highly irregular shaped particles having a broad distribution range which must be narrowed by extensive classification to control coating performance. The technique of grinding and classification also results in large quantities of off-size material which must be either reprocessed or discarded and thus is commercially unattractive.

Spray drying processes which have been developed usually provide significant improvement in particle shape and size uniformity over the grinding technique. Conventionally, spray drying processes involve atomizing a solution or emulsion containing the polymer into droplets, mixing the droplets with a gas and holding the droplets in suspension in the gas until evaporation drives off the liquid, and heat and surface tension cause the polymer particles in the droplets to coalesce. In the case of crystalline polyesters which are not soluble in water, relatively large amounts of organic polar solvents such as the halogen-containing hydrocarbons or mixtures thereof with alcohols such as isopropyl alcohol, glycol monoethylether or phenol, must be used to provide solutions of a sprayable consistency. The use of chlorinated solvents is undesirable from the standpoint of toxicity and expense. Further, the spray dried particles tend to be porous or to contain strings and hollow shells which must be removed.

While many polymers can be formed directly into latices by emulsion polymerization, the condensation polymers such as the polyesters do not fall into that category and are emulsified by precipitating a solution of the polymer from a water-miscible solvent into water in the presence of an emulsifying agent or, in the case of polyesters having an acid value of at least 0.02 and a melt viscosity of about 300 poises or less, by admixing under high shear a melt of the polyester with an aqueous basic solution, likewise in the presence of an emulsifying agent, as for example, according to the procedure of U.S. Pat. No. 3,910,846. Recovery of small particles of solid polymer from oil-in-water emulsions by spray drying is not satisfactory when the polymer is a polyester due to the tendency of the particles to agglomerate during the solvent stripping operation. The use of a second water-immiscible organic liquid which is miscible with the first solvent and is a non-solvent for the polymer has also been suggested for breaking the oil-in-water emulsions. While the latter method avoids to a large extent the agglomeration problems associated with solvent stripping, the resulting particles are water-sensitive due to the presence of the inherently polar emulsifier required for forming the initial oil-in-water emulsion. Removal of the emulsifier is difficult, if not impossible, and the process is not satisfactory for many applications.

Dispersion processes which have been proposed for the formation of spherical particles of polymeric materials are described, for example, in U.S. Pat. Nos. 3,586,654, 3,669,922 and 3,674,736. Typically, these processes involve heating the polymer to a temperature above its melting point in an inert liquid in the presence of a nonionic dispersing agent of the polyoxyalkylene glycol type using high shear agitation to form a dispersion with the polymer in finely divided form, after which the dispersion is cooled to below the melting point of the polymer to harden the particles. Water is the usual liquid and processing conditions must be carefully selected and precisely controlled to regulate particle uniformity and provide particles of a desired shape, size and size distribution. Although these processes are said to be applicable to any type of thermoplastic polymer, it has been found that the polyesters cannot be processed in the manner of most polymers due to the tendency of molten polyesters to hydrolyze in the presence of water as well as the strong tendency of the particles to coalesce and agglomerate. In fact, not only must very strict controls on processing parameters and particularly, concentration, temperature and agitation conditions be maintained to obtain particles in a practical size range, but even then the yields are completely inadequate from a commercial standpoint and the particles are of limited utility due to thier moisture sensitivity.

It has also been proposed that stable organic dispersions of very fine, submicron sized particles of addition or condensation type polymers in an organic liquid in which the polymer is insoluble can be produced by polymerizing the monomer(s) in the liquid in the presence of a preformed or precursor polymer stabilizing agent which is a block or graft copolymer containing a polymeric component which is solvated by the liquid and another polymeric component which is not solvated by the liquid and associates with the polymer particles as they are formed. The formation of stable dispersions of submicron sized particles in this manner is described in several U.S. Pat. Nos. for example: 3,317,635; 3,383,352; 3,419,515; 3,514,500; 3,717,605; and 3,935,155. Further in U.S. Pat. Nos. 3,691,123 and 3,701,747, it is disclosed that certain of these polymeric agents can also be used to stabilize the dispersion of preformed, finely divided particles of certain polymers in organic liquids which are non-solvents for the polymer, and in U.S. Pat. No. 3,532,663 it is disclosed that certain polymeric stabilizing agents of this general type can also be used to form stable emulsions of submicron sized particles of mutually insoluble liquids, which display Newtonian flow characteristics or oligomers having viscosities up to 1000 poises at the temperature employed. The stable dispersions or emulsions prepared according to the above patents are useful as a component of or as liquid coating compositions. Recovery of small spherical particles of solid polymer from such dispersions by conventional techniques, however, is completely unsatisfactory due to the problems involved in handling submicron sized particles and most often results in severe particle agglomeration.

Now, in accordance with this invention, it has been found that block or graft copolymers of the above general type can be used to shape, control and standardize the size of particles of certain crystalline condensation-type polymers during the dispersion of the polymer in an aprotic liquid which is a non-solvent for the polymer using high shear agitation at a temperature above the crystalline melting point of the polymer and that the resulting dispersion, following cooling to solidify the polymer particles, provides high yields of spherical particles in a useful size range without the necessity for the system and processing controls required by the prior art dispersion processes or the need for subsequent classification. That high yields of uniform, solid spherical particles in a useful size range are obtained with the crystalline condensation-type polymers was indeed surprising since similar results are not obtained when the block or graft copolymer is omitted or when amorphous condensation-type polymers are substituted for the crystalline condensation-type polymers in the process of this invention.

Accordingly, the present invention relates to a process for producing spherical particles of crystalline, normally solid condensation-type polymers having a melt viscosity of at least 2000 poises at 20° C. above the crystalline melting point of the polymer, which process comprises agitating under conditions of shear a fluid mixture of said polymer in an aprotic liquid which is a non-solvent for said polymer and which contains dissolved or dispersed therein from 0.1 to 20%, based on the weight of said polymer, of a water-insoluble block or graft copolymer having at least one polymeric component which is soluble in the aprotic liquid and at least one other polymeric component of a different type which is insoluble in the aprotic liquid and associates with the condensation-type polymer at a temperature above the crystalline melting point of the condensation-type polymer, until a dispersion of small liquid particles is formed, agitating the dispersion while cooling to a temperature below the crystalline melting point of the condensation-type polymer until the liquid particles solidify, and recovering the resulting particles from the aprotic liquid.

The crystalline, condensation-type polymers which are used to form the spherical particles of this invention have a melt viscosity at 20° C. above the melting point of at least 2000 poises and are polyesters or polyamides which have a degree of crystallinity above 20% and preferably from about 25 to about 80%. The polyesters can be homopolyesters, copolyesters or terpolyesters and contain a series of predominantly carbon atom chains joined by recurring carbonyloxy radicals

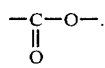

Preferred are the crystalline liner homopolyesters or copolyesters having a melting point of at least about 40° C., and most preferably from about 50° to about 150° C., and a reduced specific viscosity (RSV) of at least about 0.15 dl/g ($\eta$sp/$_C$, as determined on a solution of 0.5 gram of the polyester in 100 cc. of chloroform at 30° C.), and particularly the polyesters prepared from aliphatic and/or aromatic dicarboxylic acids or ester-forming derivatives thereof and one or more difunctional alcohols, for example, ethylene glycol, trimethylene glycol, 1,4-butanediol, neopentyl glycol, hexamethylene glycol, decamethylene glycol, eicosamethylene glycol, and similar diols. Typical dicarboxylic acids include the aromatic dicarboxylic acids such as phthalic acid, isophthalic acid and terephthalic acid and aliphatic dicarboxylic acids such as oxalic, malonic, succinic, adipic, suberic, azelaic, sebacic, dodecanedioic, octadecanedioic, and the like. Preferred are the crystalline aliphatic polyesters of an aliphatic diol having 2 to 20 carbon atoms and aliphatic dicarboxylic acids having 2 to 18 carbon atoms, and particularly those aliphatic polyesters having a melt viscosity at 20° C. above the crystalline melting point, of at least about 2500 poises and most preferably from about 3000 to 15,000 poises.

The crystalline polyamides are linear homopolyamides or copolyamides prepared by the polymerization of diamines and dibasic acids or polyamide-forming functional derivatives of these acids. As examples of suitable diamines are the straight chain polymethylene aliphatic diamines of the general formula $H_2N(CH_2)_nNH_2$, where n is not less than 2 and not greater than 20; branched chain aliphatic diamines such as 2,2,4-trimethyl hexamethylene diamine; ether diamines such as 3,3'-bis(aminopropyl)ether and ethylene bis(3-aminopropyl)ether; cycloaliphatic diamines such as 1,4-bis(aminomethyl) cyclohexane and bis(4-aminocyclohexyl) methane; aryl aliphatic diamines such as m-xylylene diamine and p-xylylene diamine; and heterocyclic diamines such as 2-piperazine. The above diamines may be condensed singly or in various combinations as appropriate and familiar to those skilled in the art with straight chain polymethylene dicarboxylic acids (or their polyamide-forming functional derivatives) of the general formula $ROOC(CH_2)_mCOOR$, where each R is hydrogen (or a functional group) and m is a positive integer not greater than 20; with branched chain aliphatic dicarboxylic acids, for example, 2-methyl butane-1,4-dicarboxylic acid; with cycloaliphatic dicarboxylic acids, for example, cyclohexane-1,4-dicarboxylic acid; with aromatic dicarboxylic acids, for example, terephthalic acid, isophthalic acid, 2,5-dimethyl terephthalic acid, naphthalene-1,4-dicarboxylic acid, and benzophenone-2,4'-dicarboxylic acid; with arylaliphatic dicarboxylic acids, for example, 2,5-dimethyl-p-phenylene diacetic acid, 2,2-bis(p-carboxymethoxyphenyl) propane and bis(p-carboxy-methyl phenyl) ether; and with heterocyclic dicarboxylic acids, for example, furan 2,5-di($\beta$-propionic acid); and with mixtures of any of the above acids. Polyamides and copolyamides may also be prepared from $\omega$-amino acids or the derived cyclic lactams, used either alone or in combination with the above diacids and diamines in appropriate stoichiometric balance, for example, $\epsilon$-aminocaproic acid, caprolactam, $\omega$-aminodecanoic acid, $\omega$-aminoundecanoic acid, $\omega$-aminododecanoic acid, 7-heptanolactam and 8-octanolactam. The preferred polyamides have crystalline melting points above about 100° C., a reduced specific viscosity (RSV) of at least about 0.2 and preferably at least about 0.4 ($\eta$sp/$_C$, as determined on a 0.1% solution in butanol at 30° C.) and a melt viscosity at 20° C. above the crystalline melting point of at least about 2500 poises and more preferably from about 3000 to 15,000 poises. Particularly suitable are the polyamides available commercially under the designation Nylon 11 and Nylon 12.

Other ingredients such as heat and light stabilizers, antioxidants, antistatic agents, viscosity improvers, mold release agents, flame retardants, pigments, fillers, extenders, additives to control electrical and magnetic properties, and the like can also be present in amounts which do not detract from the advantages of the invention. Such ingredients can be incorporated as an additive to the fluid mixture or can be an ingredient of the condensation-type polymer. Usually, and particularly when the additive is pigmentary, it is advantageous to introduce the additive into one of the reactants prior to or during the condensation reaction. Particularly useful pigments, in addition to the conventional organic and inorganic colorants, are the conductive and non-conductive carbon blacks, generally present in a concentration ranging from about 5 to about 20% by weight of the product and the magnetic iron oxides in amounts up to about 70% and preferably about 30 to about 65 % by weight of the product.

In carrying out the process of this invention a mixture of the condensation polymer in an aprotic liquid which is a non-solvent for the polymer is agitated under conditions of shear in the presence of 0.1 to 20%, and preferably from 0.5 to 10%, based on the condensation polymer of a water-insoluble block or graft copolymer having at least one polymeric component which is soluble in the aprotic liquid and at least one other polymeric component of a different type which is insoluble in the aprotic liquid and associates with the condensation-type polymer, at a temperature which is above the crystalling melting point of the condensation polymer. Block or graft copolymers of the above type are known macromolecules having a number average molecular weight above about 2000, usually above about 5000, and preferably from about 10,000 to 100,000. Generally, the polymeric component(s) which is (are) soluble will have a molecular weight of at least about 1500 and will comprise from about about 20 to about 95, preferably about 60 to about 90 weight percent of the block or graft copolymer and the other polymeric component(s) which is (are) insoluble will have a molecular weight of at least about 500, preferably at least about 1000, and will make up the remainder of the copolymer.

The preferred graft copolymers are of two types and can generally be structurally described as (1) copolymers in which the backbone is the diluent soluble component and the side chains are the diluent insoluble component, or (2) copolymers in which the backbone is the diluent insoluble component and the side chains are the diluent soluble component. These preferred graft copolymers may be made by one of three synthetic routes including (a) copolymerization of an ethylenically unsaturated monomer with a macromer, said macromer being a low molecular weight polymer containing a polymerizable olefinic end group; (b) direct reaction of low molecular weight polymer containing a reactive end group with a backbone polymer containing groups reactive with the low molecular weight polymer; (c) polymerization of an ethylenically unsaturated monomer onto a preformed polymer backbone. More specifically, graft copolymers prepared by method (a) include copolymers of a higher alkyl (preferably 10 to 24 carbon alkyl) acrylate with a diluent insoluble macromer, such as a low molecular weight aliphatic polyester or polyamide containing copolymerizable end groups derived by reaction of the carboxyl, hydroxyl or amino end groups of the polymer with an epoxy or hydroxy substituted acrylic monomer, to give Type 1 graft copolymers, or copolymers of lower alkyl (1-4 carbons) acrylates with diluent soluble macromers, such as glycidyl methacrylate end capped poly(12-hydroxy stearic acid), to give Type 2 graft copolymers. Preferred graft copolymers produced by method (b) are copolymers prepared by reacting an acid-modified amorphous polyolefin such as maleic-modified polypropylene with an hydroxyl terminated aliphatic polyester such as the condensation polymer from an aliphatic dicarboxylic acid and a slight stoichiometric excess of a difunctional alcohol, to give Type 1 structures. Preferred graft copolymers by method (c) include copolymers prepared by reacting aliphatic polyesters or polyamides, which are diluent insoluble and which contain low levels of unsaturation such as obtained by using maleic or fumaric acid as part of the dibasic acid used in preparing the polyester or polyamide, by free radical initiated grafting with ethylenically unsaturated monomers, such as the higher fatty acid esters of unsaturated acids such as acrylic or methacrylic acid. Particularly preferred are the graft copolymers (Structure 1, Method a) prepared from higher alkyl methacrylates such as lauryl methacrylate and the macromer prepared by reacting glycidyl methacrylate and an aliphatic polyester such as poly(butylene adipate), poly(butylene sebacate), poly(hexamethylene adipate) or an aliphatic polyamide such as poly(10-aminodecanoic acid); and the graft copolymers prepared from maleic-modified amorphous polypropylene and poly(butylene adipate), poly(hexamethylene sebacate) and the like.

The preferred block copolymers are composed of relatively long sequences or "blocks" of different polymeric components chemically linked to form a linear molecule, one polymeric component being derived from an ethylenically unsaturated hydrocarbon such as styrene, alpha-methylstyrene, t-butyl styrene, vinyl toluene, ethylene, propylene and isobutylene and the different polymeric component being derived from esters, amides or nitriles or unsaturated acids. Particularly preferred block copolymers are copolymers of alkyl styrenes (where the alkyl group contains 1 to 4 carbon atoms) and alkyl methacrylates where the alkyl group contains 1 to 2 carbon atoms. Block and graft copolymers of the above types and methods for their preparation are discussed by A. S. Hoffman and R. Bacskai in Chapter VI of "Copolymerization" edited by George E. Ham, Interscience Publishers, New York (1964) and by D. J. Wolbridge in Chapter 3 of "Dispersion Polymerization in Organic Media" edited by K. E. J. Barrett, Interscience Publishers, New York (1975).

As stated, the process of this invention is carried out using an aprotic liquid diluent which is a non-solvent for the crystalline condensation-type polymer. Non-solvents of this type are normally liquid hydrocarbons which are volatile at a temperature which is at least as high as the melting point of the polymer. Preferred diluents include the aliphatic and aromatic hydrocarbons containing about 5 to about 10 carbon atoms and particularly paraffinic hydrocarbon mixtures and the aromatic hydrocarbons such as benzene, toluene, ethyl benzene, xylene and the like. Mixtures of any of the aove diluents can be used.

The amount of diluent used is not critical and is largely a matter of choice and convenience, the practical requirement being that sufficient diluent is present to provide fluidity and ease of agitation. Generally, the ratio of diluent to polymer will range from about 2:1 to about 50:1, and preferably from about 4:1 to about 20:1. Amounts of diluent above 50:1 are not harmful but usually impractical due to the expense and time involved to remove and recover the organic diluent.

In the first step of the process of this invention, the fluid mixture of condensation-type polymer, aprotic liquid and the block or graft copolymer is agitated under conditions of shear at a temperature above the melting point of the condensation-type polymer until a dispersion of small liquid particles is formed. This step of the process can be carried out in any suitable apparatus such as a tank fitted with a suitable agitator, heating means and condenser, as needed, to bring the polymer to a point of fluidity and maintain the diluent in the liquid stage. Agitation under conditions of shear is necessary to subdivide the condensation-type polymer as it becomes molten and to form a dispersion of the small liquid particles. The shear requirement can be effected via high speed agitation, e.g., a high shear mixer. Any type of mixing or agitation apparatus which is capable of forming a dispersion of the fluid particles and maintaining the particles in a highly dispersed state will meet this objective. Generally, the level of agitation will be selected and controlled to provide a dispersion of liquid particles in a size within the range of about 1 to 300 microns and preferably about 5 to 100 microns.

Following the formation of the dispersion of the small liquid particles, the dispersion is cooled to a temperature below the crystalline melting point of the condensation-type polymer and agitation is continued until the particles solidify. High shear agitation is neither necessary nor desirable at this stage and the only requirement is that sufficient agitation be employed while the dispersed polymer is in a molten state to avoid settling and/or reagglomeration of the dispersed particles. A convenient technique for carrying out this step of the process involves passing the hot dispersion through a homogenizer directly into a cooling vessel equipped with a slow stirrer and continuing stirring until the particles solidify. Following solidification, the particles can be recovered conventionally, as by filtration, decantation, centrifugation or any other convenient separation technique, and then can be washed and dried.

The particles produced by the process of this invention are non-agglomerating spheres having diameters ranging from about 1 to about 300, preferably about 5 to about 100 microns. The particles pack better than do irregularly shaped particles, are easily fluidized and, upon application to a heated substrate, lead to uniform coatings. Pigmented particles are substantially uniform in composition and provide a complete solid coating system without further compounding. The pigmented particles are particularly useful as toners in electrostatic printing and copying systems. The toners do not block under ambient operating conditions, melt sharply near the minimum fusion temperature which is a practical low temperature to avoid excessively high energy consumption and possible heat damage to the copy substrate or machine parts and have an acceptable viscosity over a wide fusion range, thus providing a high degree of flexibility in electrostatographic copying processes.

Having described the invention generally, the following examples are given to illustrate specific embodiments thereof. All parts and percentages are by weight unless otherwise indicated.

EXAMPLE 1

A pigmented crystalline poly(butylene adipate) containing 6% of carbon black was prepared by heating the following ingredients in the ratios given at 160° to 180° C. until the desired viscosity was reached, the carbon black having been predispersed in the 1,4-butanediol.

| Ingredients | Parts |
| --- | --- |
| 1,4-butanediol | 639 |
| carbon black (Raven 420) | 83 |
| adipic acid | 1036 |
| tetrabutyl titanate catalyst | 10 |

The poly(butylene adipate) had a reduced specific viscosity of 0.25 dl/g (measured on a solution of 0.5 gram of polymer in 100 cc. of chloroform at 30° C.), a weight average molecular weight of 16,000, a crystalline melting point of 58°–60° C. and a melt viscosity of 4000 poises at 80° C.

A graft copolymer containing poly(butylene adipate) components and a glycidyl methacrylate/lauryl methacrylate copolymer component was prepared by reacting 60 parts of poly(butylene adipate) having a weight average molecular weight of 3620 and an acid number of 47.5 with 4 parts of glycidyl methacrylate in 30 parts of xylene containing 0.1 part of tributylamine catalyst and 0.05 part of hydroquinone at 132° C. until the acid number was 20.2, adding 3 parts of inhibitor-free lauryl mechacrylate in 6 parts of benzene and 0.3 part of azobisisobuteronitrile for each part of reaction product, and heating the mixture at 78° C. until about 40% of the lauryl methacrylate was converted to polymer. The resulting graft copolymer contained about 40 weight % of poly(butylene adipate), and had a weight average molecular weight of 67,300 and a number average molecular weight of 16,700.

A stainless steel vessel equipped with a variable speed rotor and a stator type agitator was charged with a solution of 5 parts of the above graft copolymer in 200 parts of n-heptane and 50 parts of the pigmented crystalline poly(butylene adipate) produced above, and the vessel was placed in an oil bath at 85° C. Agitation was commenced, the speed of the agitator was adjusted to 3000–5000 r.p.m. when the poly(butylene adipate) became molten and agitation was continued for 5 minutes, following which time the vessel was removed from the bath and the charge was agitated at 250 r.p.m. until the temperature of the charge was reduced to 45° C. The resulting slurry was then centrifuged and 49 parts of black spherical particles were recovered. Characterization of the particles by Coulter Counter volume % analysis showed that 16% had a particle size less than 7.5 microns, 50% had a size less than 13 microns, and 84% had a size less than 22 microns.

When the procedure set forth in the preceding paragraph was repeated except that the 5 parts of the graft copolymer were omitted, no spherical particles were obtained and the product was in the form of jagged chunks, many of which measured several millimeters in size.

EXAMPLE 2

The procedure of Example 1 was repeated except that the graft copolymer contained poly(hexamethylene sebacate) components and a glycidyl methacrylate/lauryl methacrylate copolymer component and was prepared by reacting 50 parts of a poly(hexamethylene sebacate) having a number average molecular weight of 3200 and an acid number of 42.7 with 4 parts of glycidyl methacrylate using the procedure of Example 1 at 132° C. until the acid number was 16.5, adding 3 parts of lauryl methacrylate in 6 parts of toluene, per part of the modified poly(hexamethylene sebacate) and heating the mixture at 105° C. until 90% of the lauryl methacrylate was polymerized. The resulting graft copolymer had a weight average molecular weight of 45,300, a number average molecular weight of 13,200 and contained about 25 weight % of poly(hexamethylene sebacate). The product of this example was spherical particles of which 16% by volume had a diameter less than 6 microns, 50% had a diameter less than 11 microns and 84% had a diameter less than 17 microns.

EXAMPLE 3

The procedure of the third paragraph of Example 1 was repeated except that 2 parts of a block copolymer of methyl methacrylate and t-butyl styrene was substituted for the graft copolymer of Example 1. The block copolymer had a weight average molecular weight of 41,800 and contained 40% of a poly(t-butyl styrene) block having a weight average molecular weight of 16,100. The block copolymer was prepared by polymerizing 3 parts of t-butyl styrene in toluene in the presence of n-butyl lithium catalyst at −40° C., adding one part of methyl methacrylate, containing the polymerization at −40° C. for 12 hours and recovering the resulting block copolymer from solution by precipitation in methanol. The product of this example was spherical particles, of which 16% by volume had a diameter less than 42 microns, and 84% had a diameter less than 72 microns.

EXAMPLE 4

The procedure of Example 3 was repeated except that a solution containing 5 parts of a graft copolymer containing 12-hydroxystearic acid self-ester components and a glycidyl methacrylate/methyl methacrylate copolymer component was substituted for the 2 parts of block copolymer. The graft copolymer had a number average molecular weight of 75,000, contained 50% of methyl methacrylate and was prepared by polymerizing 12-hydroxystearic acid to a number average molecular weight of 1500, reacting 51 parts of the polymer with 1 part of glycidyl methacrylate, adding 1 part of methyl methacrylate in 1 part of xylene for each part of reaction product and heating the mixture at 130° C. for 5 hours. The product of this example was 48 parts of spherical particles of which 16% by volume had a diameter less than 11 microns, 50% had a diameter less than 20 microns and 84% had a diameter less than 34 microns.

EXAMPLE 5

The procedure of Example 3 was repeated except that 5 parts of a graft copolymer of amorphous polypropylene backbone with poly(butylene adipate) units attached thereto was substituted for the 2 parts of the block copolymer. The graft copolymer had a molecular weight of 120,000, contained 85% of polypropylene and was prepared by reacting 10 parts of amorphous polypropylene containing about 6 weight % of combined maleic anhydride and having a number average molecular weight of 35,000 with 5 parts of poly(butylene adipate) having a number average molecular weight of 7000, the reaction being carried out in the melt at 90° C. The product of this example was 48 parts of spherical particles of which 50% by volume had a diameter less than 27 microns.

EXAMPLES 6 to 8

The procedure of Example 5 was repeated except that 50 parts of various pigmented (6% carbon black) crystalline polyesters were substituted for the pigmented poly(butylene adipate) of Example 1. Details of the polyesters used and the products obtained in these examples are tabulated below.

| Ex. No. | Identity | Polyester Weight Average Mol. Weight | Melting Point (°C.) | Melt Viscosity (poises) | Parts | Product Particle size at 70% by volume (microns) |
|---|---|---|---|---|---|---|
| 6 | Poly(hexamethylene adipate) | 25,300 | 60 | 10,000 | 49.4 | <37 |
| 7 | Poly(hexamethylene sebacate) | 20,500 | 67 | 8,000 | 48.1 | <42 |
| 8* | Poly(butylene sebacate) | 31,900 | 64 | 25,000 | 46 | <75 |

*In this example a mixture of aliphatic hydrocarbons having a boiling point range of 119 to 128° C. was substituted for the n-heptane and the oil bath temperature was 98° C.

EXAMPLE 9

A water-jacketed glass vessel equipped with a variable speed rotor/stator agitator was charged with 415 parts of n-heptane containing 0.6 part of the block copolymer of Example 3 and with 20 parts of a 6% pigmented crystalline poly(butylene adipate) prepared according to the procedure of Example 1 except that an equal amount of copper phthalocyanine blue pigment was substituted for the carbon black. Hot water was passed through the jacket, agitation was commenced and when the charge temperature reached 90° C., the agitator speed was increased to 10,000 r.p.m. and continued for 10 minutes. Cooling water was next passed through the jacket and agitation was continued at 250 r.p.m. until the temperature of the charge was reduced to 20° C. The resulting slurry was then centrifuged and 19 parts of blue spherical particles were recovered. Analysis of the particles by Coulter Counter volume % analysis showed that 16% had a particle size less than 10 microns, 50% had a size less than 23 microns and 84% had a size less than 46 microns.

EXAMPLE 10

The procedure of Example 9 was repeated except that 0.6 part of the graft copolymer of Example 1 was substituted for the block copolymer and 20 parts of unpigmented crystalline poly(butylene adipate) having an RSV of 0.25 dl/g, a crystalline melting point of 60° C. and a melt viscosity of 2000 poises at 80° C. was used. The recovered product (18.5 parts) was spherical particles, of which 50% by volume had a diameter less than 16 microns.

EXAMPLE 11

A stainless steel vessel equipped with a heater, a variable speed rotor and a stator type agitator was charged with 100 parts of a hydrocarbon oil (boiling point range 200° to 220° C.), 20 parts of poly(10-aminodecanoic acid) containing 7% of carbon black (Raven 420) and having a crystalline melting point of 190° C., a weight average molecular weight of 10,000 and a melt viscosity of 3000 poises at 210° C., and 3 parts of a graft copolymer containing poly(10-aminodecanoic acid) components and a glycidyl acrylate/lauryl methacrylate copolymer component. The graft copolymer was prepared by reacting 5 parts of an acrylic end-capped poly(10-aminodecanoic acid) having a molecular weight of 1500 (prepared by reaction of the poly(10-aminodecanoic acid) with glycidyl acrylate) with 25 parts of lauryl methacrylate in the presence of 0.3 part of azobisbuteronitrile, had a molecular weight of 60,000 and contained 85% of lauryl methacrylate. Agitation of the charge was commenced and the charge was heated to 210° C. and agitated at 8500 r.p.m. for 10 minutes, following which time heating was discontinued, the charge was agitated at 350 r.p.m. until the temperature was reduced to 90° C. and the resulting dispersion was filtered. The product (19.5 parts) was black spherical particles, 50% by volume of which had a diameter less than 25 microns.

EXAMPLE 12

A stainless steel vessel equipped with a heater, a variable speed rotor and a stator type agitator was charged with 100 parts of a high boiling hydrocarbon oil (boiling point range of 140° to 150° C.) containing 3 parts of a graft copolymer containing poly(propylene adipate) components and a glycidyl methacrylate/lauryl methacrylate copolymer component, and 20 parts of the pigmented crystalline poly(butylene adipate) of Example 1. The graft copolymer was prepared by reacting 50 parts of a poly(propylene adipate) having a number average molecular weight of 1500 and an acid number of 53 with 6 parts of glycidyl methacrylate at 110° C. until the acid number was 18, adding 3 parts of lauryl methacrylate per part of the reaction product and heating the mixture at 110° C., in toluene until 70% of the lauryl methacrylate was polymerized. The resulting graft copolymer had a weight average molecular weight of 56,000 and contained about 12 weight % of poly(propylene adipate). Agitation of the charge was commenced and the charge was heated to 130° C. and agitated at 10,000 r.p.m. for 15 minutes, following which time heating was discontinued, the charge was agitated at 300 r.p.m. until the temperature was reduced to 40° C. and the resulting dispersion was filtered. The product was 19 parts of black spherical particles, 50% by volume of which had a diameter of less than 27 microns.

For the sake of comparison, the above procedure was repeated except that 20 parts of amorphous polyester containing 6% of carbon black was substituted for the pigmented crystalline poly(butylene adipate). The amorphous polyester used in this comparison had a weight average molecular weight of 16,000, a glass transition temperature of 50° C. and a melt viscosity of 4000 poises at 130° C. and was prepared from bisphenol A, propylene oxide and maleic anhydride in the molar ratio of 1:2:1. When heating was discontinued and the temperature of the charge was reduced to 40° C., large chunks of colored resin formed in the vessel, and there was no evidence that any of the resin was in the form of small spherical particles.

EXAMPLE 13

The procedure of Example 1 was repeated except that the graft copolymer contained poly(butylene adipate) components and a polypropylene component and was prepared by reacting in the melt for 45 minutes 5 parts of amorphous polypropylene (RSV of 2) containing about 8 weight % of combined maleic anhydride with 2 parts of poly(butylene adipate) having a weight average molecular weight of 2000 and containing hydroxyl functionality at each end of the polymer chain, and extracting the reaction product with boiling heptane to separate the graft copolymer from unreacted poly(butylene adipate). The product of this example was 47.5 parts of black spherical particles of which 50% by volume had a diameter less than 17 microns.

EXAMPLE 14

The procedure of Example 13 was repeated except that 50 parts of the pigmented poly(hexamethylene sebacate) of Example 7 was substituted for the pigmented poly(butylene adipate) of Example 1. The product of this example was 49 parts of block spherical particles of which 50% by volume had a diameter less than 19 microns.

EXAMPLE 15

A pigmented crystalline poly(butylene adipate) containing 50% of magnetic iron oxide was prepared according to the first paragraph of Example 1 that 1,657 parts of magnetite having an average particle diameter range of 0.15 to 0.30 micron were substituted for the 83 parts of Raven 420 carbon black.

A glass vessel equipped with a variable speed, high shear agitator was charged with a solution of 5 parts of the graft copolymer of Example 1 in 200 parts of n-heptane and 50 parts of the 50% magnetic iron oxide pigmented crystalline poly(butylene adipate). The charge was steam heated to 90° C. with moderate agitation and when the polymer became molten the agitator speed was adjusted to 10,000 r.p.m. and agitation was continued for about 7 minutes. Next the agitator speed was adjusted to 250 r.p.m. and agitation was continued until the temperature of the charge was reduced to room temperature. The resulting dispersion was then centrifuged and the black spherical particles were recovered. Fifty percent by volume of the particles obtained in this example had a diameter less than 50 microns.

EXAMPLE 16

The procedure of Example 1 was repeated except that the graft copolymer was prepared as follows. An aliphatic polyester containing low levels of unsaturated was first prepared by reacting 60 parts of adipic acid, 4 parts of maleic acid and 105 parts of butanediol with 0.1 part tetrabutyl titanate catalyst to form a polymer having a weight average molecular weight of 9000. Then 10 parts of the resulting unsaturated polyester dissolved in 30 parts of toluene were reacted with 10 parts of lauryl methacrylate, 1 part of butyl acrylate and 0.3 part of benzoyl peroxide at 100° C. for three hours, following which time the solvent was removed to give 18 parts of a brown tacky graft copolymer. The product of this example was spherical particles of which 50% by volume had a diameter less than 27 microns.

What I claim and desire to protect by Letters Patent is:

1. A process for producing spherical particles having diameters ranging from about 1 to about 300 microns of polyester or polyamide crystalline, normally solid condensation-type polymers having a melt viscosity of at least 2000 poises at 20° C. above the crystalline melting point of the polymer and having a degree of crystallinity above 20%, which process comprises agitating under conditions of shear a fluid mixture of said polymer in an aprotic liquid which is a non-solvent for said polymer and which contains dissolved or dispersed therein from 0.1 to 20%, based on the weight of said polymer of a water-insoluble block or graft copolymer having a number average molecular weight above about 2000 and having at least one polymeric component which is soluble in the aprotic liquid and at least one other polymeric component of a different type which is insoluble in the aprotic liquid and associates with the condensation-type polymer, at a temperature above the crystalline melting point of the condensation-type polymer until a dispersion of liquid particles having a size within the range of about 1 to 3000 microns is formed, agitating the dispersion while cooling to a temperature below the crystalline melting point of the condensation-type polymer until the liquid particles solidify, and recovering the resulting particles from the aprotic liquid.

2. The process of claim 1 wherein the crystalline condensation-type polymer is a polyester.

3. The process of claim 2 wherein the polyester is an aliphatic polyester.

4. The process of claim 3 wherein the polyester is pigmented.

5. The process of claim 4 in which the pigment is carbon black.

6. The process of claim 4 in which the pigment is magnetic iron oxide.

7. The process of clim 3 wherein the polyester has a crystalline melting point between about 50° and about 110° C.

8. The process of claim 7 wherein the copolymer is a graft copolymer prepared from a 10–24 carbon alkyl methacrylate and an aliphatic polyester which has been reacted with glycidyl methacrylate.

9. The process of claim 8 wherein both the condensation-type polymer and the aliphatic polyester of the graft copolymer are poly(butylene adipate).

10. The process of claim 9 in which the crystalline condensation-type polymer is pigmented.

11. The process of claim 10 in which the pigment is magnetic iron oxide.

12. The process of claim 8 wherein the both the condensation-type polymer and the aliphatic polyester of the graft copolymer are poly(hexamethylene sebacate).

13. The process of claim 7 wherein the copolymer is a graft copolymer prepared from an aliphatic polyester and maleic modified amorphous polypropylene.

14. The process of claim 13 wherein both the condensation-type polymer and the aliphatic polyester of the graft copolymer are poly(butylene adipate).

15. The process of claim 3 wherein both the condensation-type polymer and the aliphatic polyester of the graft copolymer are poly(hexamethylene sebacate).

* * * * *

UNITED STATES PATENT AND TRADEMARK OFFICE
CERTIFICATE OF CORRECTION

PATENT NO. : 4,267,310
DATED : May 12, 1981
INVENTOR(S) : Leo M. Landoll

It is certified that error appears in the above-identified patent and that said Letters Patent are hereby corrected as shown below:

Column 14, line 1 of Claim 7 -

"clim 3" should read --claim 3-- .

Column 14, line 1 of Claim 15 -

"claim 3" should read --claim 13-- .

Signed and Sealed this

Twenty-first Day of July 1981

[SEAL]

Attest:

GERALD J. MOSSINGHOFF

Attesting Officer   Commissioner of Patents and Trademarks